(12) United States Patent
Koharazawa et al.

(10) Patent No.: US 11,130,450 B2
(45) Date of Patent: Sep. 28, 2021

(54) DEPOSIT REMOVAL SYSTEM, AND DEPOSIT REMOVAL METHOD

(71) Applicants: DENSO TEN Limited, Kobe (JP); TOYOTA JIDOSHA KABUSHIKI KAISHA, Toyota (JP)

(72) Inventors: Masahiro Koharazawa, Kobe (JP); Shinya Hirosawa, Nisshin (JP); Ryota Hamabe, Nisshin (JP); Kazuki Masuda, Miyoshi (JP)

(73) Assignees: DENSO TEN Limited, Kobe (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 213 days.

(21) Appl. No.: 16/292,143

(22) Filed: Mar. 4, 2019

(65) Prior Publication Data

US 2019/0315288 A1 Oct. 17, 2019

(30) Foreign Application Priority Data

Apr. 16, 2018 (JP) .............................. JP2018-078450

(51) Int. Cl.
| | |
|---|---|
| *B60R 11/04* | (2006.01) |
| *B60S 1/56* | (2006.01) |
| *G02B 27/00* | (2006.01) |
| *B60S 1/34* | (2006.01) |
| *B60S 1/02* | (2006.01) |
| *B60S 1/38* | (2006.01) |

(52) U.S. Cl.
CPC ............... *B60R 11/04* (2013.01); *B60S 1/02* (2013.01); *B60S 1/3409* (2013.01); *B60S 1/566* (2013.01); *G02B 27/0006* (2013.01); *B60K 2370/1438* (2019.05); *B60K 2370/21* (2019.05); *B60S 2001/3831* (2013.01)

(58) Field of Classification Search
None
See application file for complete search history.

(56) References Cited

U.S. PATENT DOCUMENTS

| | | | | |
|---|---|---|---|---|
| 8,208,043 B2* | 6/2012 | Deng | ................... | G06T 7/0002 |
| | | | | 348/241 |
| 9,327,689 B2* | 5/2016 | Kikuta | ................... | B60S 1/56 |
| 10,013,616 B2* | 7/2018 | Gehrke | ................... | G06T 5/00 |
| 10,029,653 B1* | 7/2018 | Singer | ................... | B60S 1/44 |
| 10,538,221 B2* | 1/2020 | Singer | ................... | B60S 1/522 |

(Continued)

FOREIGN PATENT DOCUMENTS

| | | | |
|---|---|---|---|
| JP | 2007-269247 A | | 10/2007 |
| JP | 2008-265727 A | | 11/2008 |

(Continued)

*Primary Examiner* — Dale W Hilgendorf
*Assistant Examiner* — Alexander C. Bost
(74) *Attorney, Agent, or Firm* — Oliff PLC

(57) ABSTRACT

A deposit removal system includes a camera, display means that displays an image that is acquired by the camera, detection means that detects an operation of a user on the display means, deposit removal means that performs a removal action for removing a deposit that is attached to a lens of the camera, and control means that causes the deposit removal means to perform the removal action, based on the operation on an image detected by the detection means.

12 Claims, 14 Drawing Sheets

(56) References Cited

U.S. PATENT DOCUMENTS

| | | | |
|---|---|---|---|
| 2010/0188343 A1* | 7/2010 | Bach | G06F 3/03547 |
| | | | 345/173 |
| 2013/0037627 A1* | 2/2013 | Kikuta | B60S 1/583 |
| | | | 239/284.1 |
| 2013/0255023 A1* | 10/2013 | Kikuta | B60S 1/483 |
| | | | 15/250.02 |
| 2016/0185319 A1* | 6/2016 | Tan | B60S 1/20 |
| | | | 15/250.29 |
| 2017/0036650 A1* | 2/2017 | Hester | B60S 1/56 |
| 2017/0182980 A1* | 6/2017 | Davies | B60S 1/54 |
| 2017/0210351 A1* | 7/2017 | Ghannam | B60S 1/50 |
| 2017/0313288 A1* | 11/2017 | Tippy | B60R 11/04 |
| 2018/0043863 A1* | 2/2018 | Singer | B60K 5/00 |
| 2019/0202410 A1* | 7/2019 | Zhao | B05B 1/08 |

FOREIGN PATENT DOCUMENTS

| | | | | |
|---|---|---|---|---|
| JP | 2009-206582 A | 9/2009 | | |
| JP | 2009-296127 A | 12/2009 | | |
| JP | 2010-178221 A | 8/2010 | | |
| JP | 2013-080177 A | 5/2013 | | |
| JP | 2013-082358 A | 5/2013 | | |
| JP | 2014013454 A * | 1/2014 | | |
| JP | 2017054555 A | 3/2017 | | |
| JP | 2017-167544 A | 9/2017 | | |
| WO | WO-2014007153 A1 * | 1/2014 | | H04N 5/225 |
| WO | 2015/125815 A1 | 8/2015 | | |

* cited by examiner

DEPOSIT REMOVAL SYSTEM, AND DEPOSIT REMOVAL METHOD

CROSS-REFERENCE TO RELATED APPLICATION

This application is based upon and claims the benefit of prior Japanese Patent Application No. 2018-078450 filed on Apr. 16, 2018, the entire contents of which are incorporated herein by reference.

FIELD

The present invention relates to a deposit removal system and a deposit removal method.

BACKGROUND

Conventionally, outdoor cameras to be installed outdoors are widely used. As the outdoor cameras, vehicle-mounted cameras and surveillance cameras may be cited, for example. A vehicle-mounted camera is installed outside and at a rear of a vehicle as a back camera, for example, and is used by a back monitor device that enables checking of a surrounding state of the vehicle by displaying an image captured by the vehicle-mounted camera on a display device inside the vehicle. When such an outdoor camera is used outdoors, droplets of rain or the like and stains such as mud tend to get attached to a surface of a lens of the outdoor camera. When such deposits are attached to the lens, images that are captured tend to become blurry.

To solve such a problem, a technique for removing deposits attached to a surface of a lens is being proposed. For example, Patent document 1 discloses, with respect to a vehicle-mounted camera, a camera with a droplet removal function including a droplet removal function for removing droplets by causing a capturing unit to vibrate in a swinging direction of an optical axis of a lens. Moreover, Patent document 2 discloses a back monitor device, for a vehicle, for determining presence/absence of deposits on a camera by comparing an image (real image) of a part of the vehicle shown by a part of a camera and a reference image corresponding to a real image when no deposits are attached to the camera.

[Patent document 1] Japanese Patent Laid-Open No. 2013-80177
[Patent document 2] Japanese Patent Laid-Open No. 2008-265727

SUMMARY

The invention disclosed in Patent document 1 implements the droplet removal function by displaying a button for implementing the droplet removal function on a touch panel display, together with an image captured by a rear camera, and by a user pressing the button. The invention disclosed in Patent document 2 automatically causes a deposit removal device to operate, when it is detected that droplets of rain, stains or the like are attached to a camera, and a surface of the camera may thus be maintained in a clean state at all times.

With the invention disclosed in Patent document 1, the droplet removal function may be implemented simply by pressing the button, and a user may easily perform the operation. With the invention disclosed in Patent document 2, the deposit removal device is automatically operated, and thus, a special operation for removing deposits is not necessary. However, with these inventions, there is a drawback that it is difficult to provide fun nor excitement in the work for operation of removing deposits. Accordingly, there is a demand for a technique which is capable of providing a user with more fun and excitement of operation.

The present invention has been made to meet such a demand, and has its object to provide a technique which is capable of providing a user with more fun and excitement of operation in removal of deposits attached to a lens surface of a camera.

To achieve the object described above, the present invention adopts the following means. That is, the present invention is a deposit removal system including a camera, display means that displays an image that is acquired by the camera, detection means that detects an operation of a user on the display means, deposit removal means that performs a removal action for removing a deposit that is attached to a lens of the camera, and control means that causes the deposit removal means to perform the removal action, based on the operation on the image detected by the detection means.

That is, the present invention removes a deposit according to an operation performed by a user on an image in which the deposit is displayed. Accordingly, the user may be provided with a sensation of actually removing a deposit by the operation of the user. Furthermore, the user may remove a deposit by an intuitive operation based on the image. Therefore, with the present invention, fun and excitement may be provided to the user in removal of deposits.

The control means may include a display control unit that determines whether or not the operation is an enlarging operation, as a specific operation, that is performed on the image, and that displays a target of the enlarging operation on the display means in an enlarged manner, when the operation is the enlarging operation. A user may thereby easily perform a removal operation by performing the enlarging operation on a deposit that the user wants to remove, and by causing the deposit to be displayed in an enlarged manner. As a result, according to the present invention, removal of deposits may be more reliably performed.

Furthermore, the control means may include a removal action control unit that determines whether or not the operation detected by the detection means is a removal operation, as a specific operation, that is performed on the image, and that causes the deposit removal means to perform the removal action, when the operation is the removal operation. To remove a deposit, a user has to perform a specific operation on an image. Accordingly, a game property may be added to removal of deposits, and even more fun and excitement may be provided to the user.

The removal operation may be a contact operation on the image. This enables a user to remove a deposit by a more intuitive operation. Moreover, the removal operation may be a contact operation on the image, and may be any of a slide operation, a flick operation, a tap operation, a double-tap operation, and a triple-tap operation.

The control means may further include a deposit detection unit that detects the deposit in the image, and when a target of the removal operation is a specific deposit in the image, the removal action control unit may cause the deposit removal means to perform the removal action on the specific deposit. This enables a user to reliably remove a deposit that the user wants to remove. Furthermore, by allowing the user to select a deposit which is to be taken as a removal target, a game property may be added to removal of deposits. As a result, according to the present invention, even more fun and excitement may be provided to the user in removal of deposits.

The removal action control unit may change a direction of removing the deposit, according to an operation direction of the removal operation, or may change strength for removing the deposit, according to an operation speed of the removal operation, or may change strength for removing the deposit, according to an operation distance of the removal operation. Accordingly, a behavior of a deposit to be removed may better reflect the removal operation of a user. As a result, even more fun and excitement may be provided to the user in removal of deposits.

The display means may acquire the image from the camera by performing wireless communication with the camera, and the control means may cause the deposit removal means to perform the removal action, by performing wireless communication with the deposit removal means. This allows the camera and the deposit removal means to be installed at a remote location of other components. Accordingly, the present invention may be suitably used for removal of deposits on a remote camera, such as a surveillance camera.

Furthermore, the present invention may also be identified as a deposit removal method. That is, the present invention is a deposit removal method for detecting an operation of a user on display means that displays an image that is acquired by a camera, and for removing a deposit that is attached to a lens of the camera, based on the operation, the method including determining whether or not the operation is a removal operation, as a specific operation, that is performed on the image, and performing a removal action for removing the deposit, when the operation is the removal operation.

According to the present invention, more fun and excitement of operation may be provided to a user in removal of deposits attached to a lens surface of a camera.

DESCRIPTION OF EMBODIMENTS

Hereinafter, a preferred embodiment of the present invention will be described with reference to the drawings. However, the embodiment described below is an exemplary mode for carrying out the present invention, and the present invention is not limited to the aspect described below.

Figure 1:
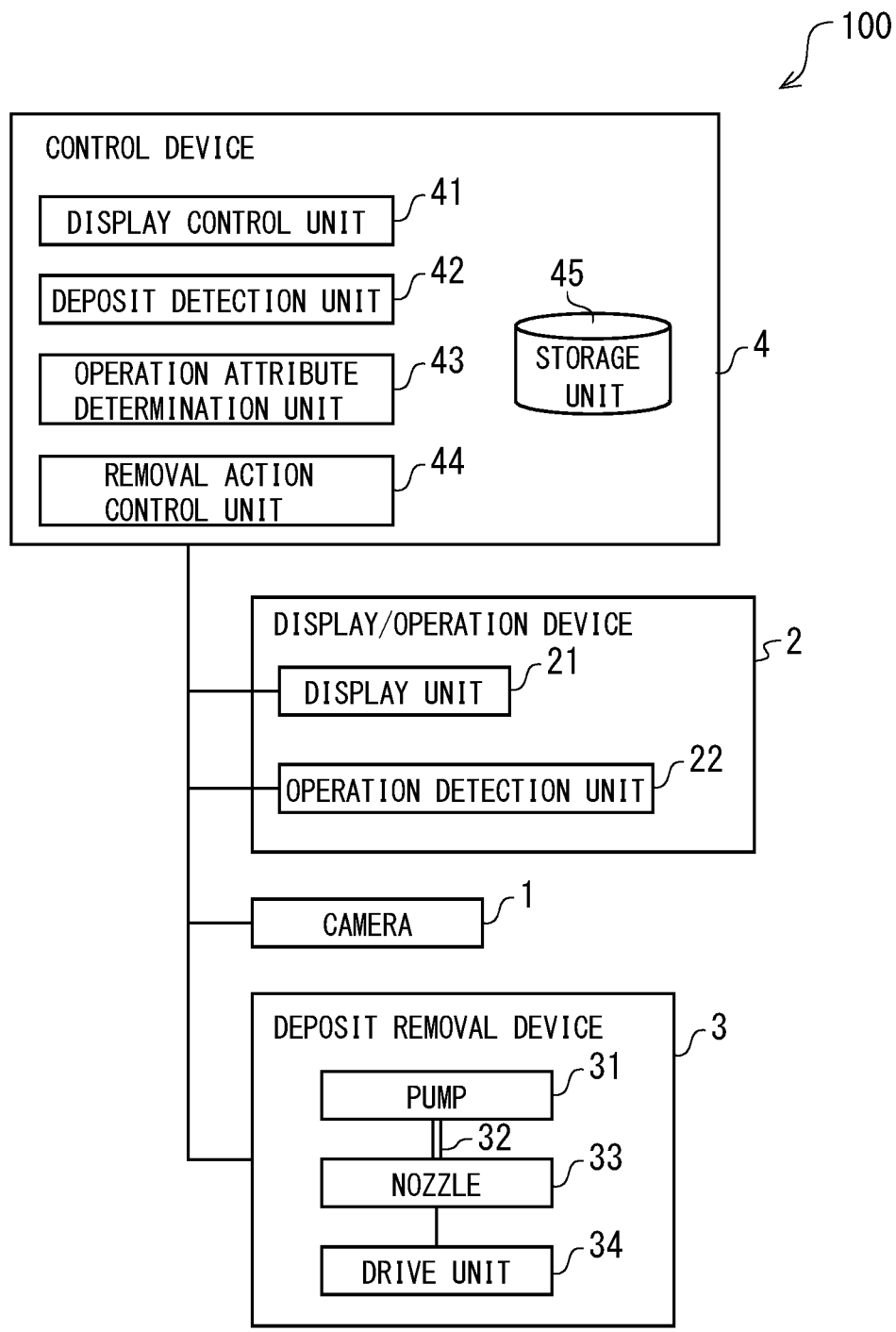
FIG. 1 is a block diagram illustrating a deposit removal system according to an embodiment.

FIG. 1 is a block diagram illustrating a deposit removal system (hereinafter "removal system") 100 according to an embodiment. The removal system 100 according to the embodiment includes a camera 1 that is mounted on a vehicle while being installed outside the vehicle, and that acquires (captures) an image of surroundings of the vehicle, a display/operation device 2 that displays the image acquired by the camera 1, and that receives an operation by a user, a deposit removal device 3 that removes deposits attached to a lens 11 of the camera 1, and a control device 4 that causes the deposit removal device 3 to remove droplets or stains such as mud (hereinafter "deposit(s)") attached to the lens 11 of the camera 1 according to an operation on the display/operation device 2 by the user, by controlling the display/operation device 2 and the deposit removal device 3. In the following, a detailed description of each component of the removal system 100 will be given.

Figure 5:
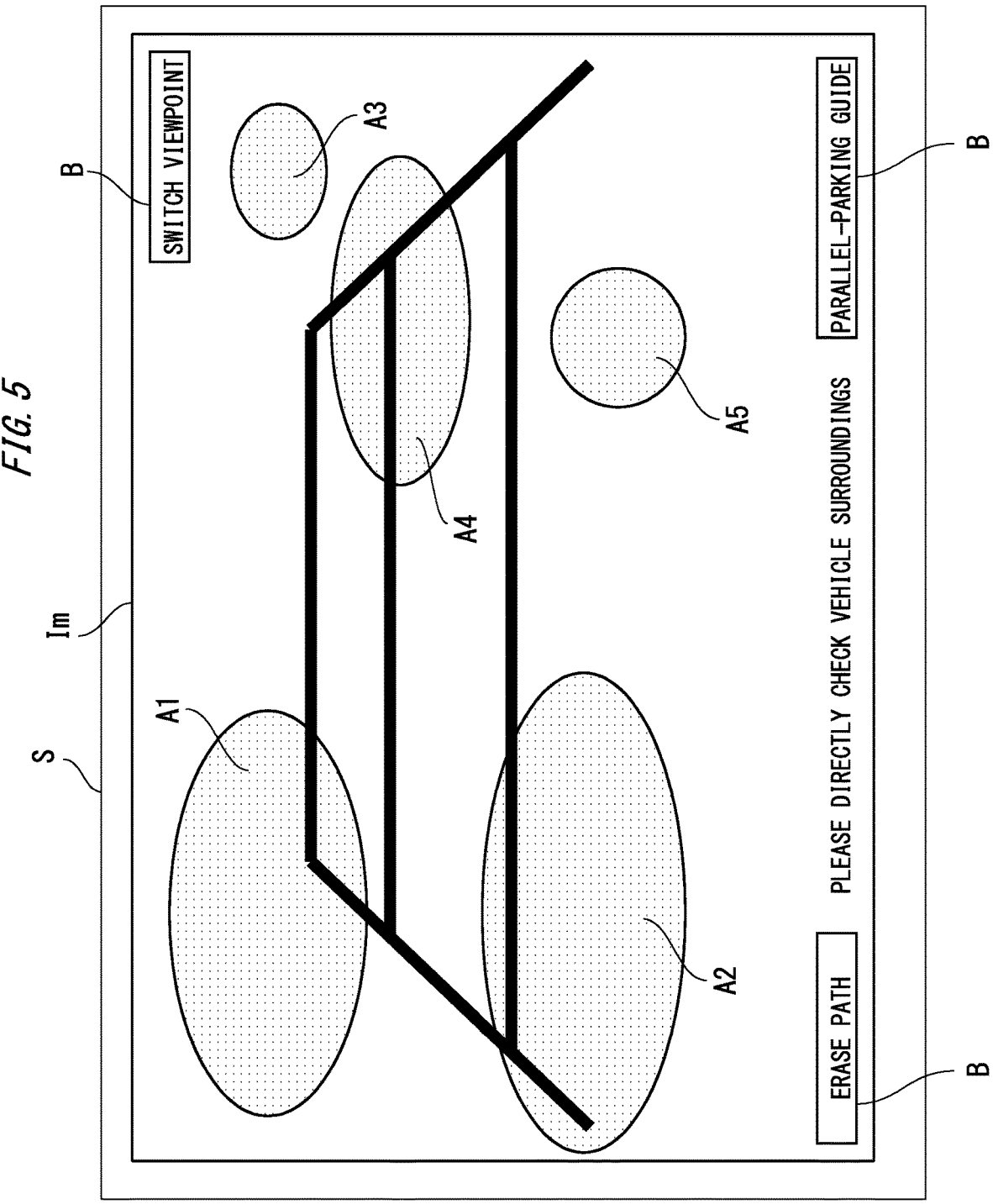
FIG. 5 is a diagram illustrating a screen that is displayed on a display unit, and is a diagram illustrating the screen displaying an image including deposits.

The camera 1 includes the lens 11 and an image element, and electronically acquires an image of surroundings of the vehicle. Specifically, the camera 1 is a back camera that is provided outside and at a rear of the vehicle and that acquires an image of surroundings on a rear side of the vehicle. The camera 1 acquires the image of the surroundings every predetermined period (such as every 1/30 seconds), and inputs, to the control device 4, a video signal which takes each image as one frame of a moving image. For example, the camera 1 acquires an image of the surroundings on the rear side of the vehicle, as illustrated in FIG. 5, when the vehicle moves backward. Note that in the present specification, an "image" refers to an image that is acquired by the camera 1 unless specified otherwise.

The display/operation device 2 is installed inside the vehicle, at a position which is visible to a user (mainly, a driver), and includes a display unit 21 that displays various pieces of information to the user according to control of the control device 4, and an operation detection unit 22 that detects that a contact operation is performed by the user on a screen that is displayed on the display unit 21, and that outputs operation information to the control device 4.

Specifically, the display/operation device 2 is a touch panel display (hereinafter "touch panel") structured by installing the operation detection unit 22 on top of the display unit 21. The display unit 21 is a liquid crystal panel, an organic EL, a plasma display or the like, for example. As the method used by the operation detection unit 22 to detect a contact, a pressure detection method, a resistive film method, a capacitive method, an electromagnetic induction method, and the like may be adopted. The display unit 21 is an example of "display means" of the present invention. The operation detection unit 22 is an example of "detection means" of the present invention.

When an object contacts the display unit 21 due to a contact operation of a user, the operation detection unit 22 detects the contact of the object with the display unit 21 based on an amount of change in pressure, electrical resistance, electrical capacitance, energy, or the like at the contact position, and identifies position coordinates subject to the contact on the display unit 21 (hereinafter "contact position coordinates"). The operation detection unit 22 outputs presence/absence of contact, the contact position coordinates, and the like to the control device 4 as operation information. Here, the operation detection unit 22 is capable of simultaneously detecting a plurality of contacts, and of acquiring all the contact position coordinates. In the following description, an operation performed by a finger of a user touching the screen is described as the contact operation, but it should be noted that the contact operation may be performed by using an object other than a finger, such as a stylus pen held by a user, for example.

Figure 2:
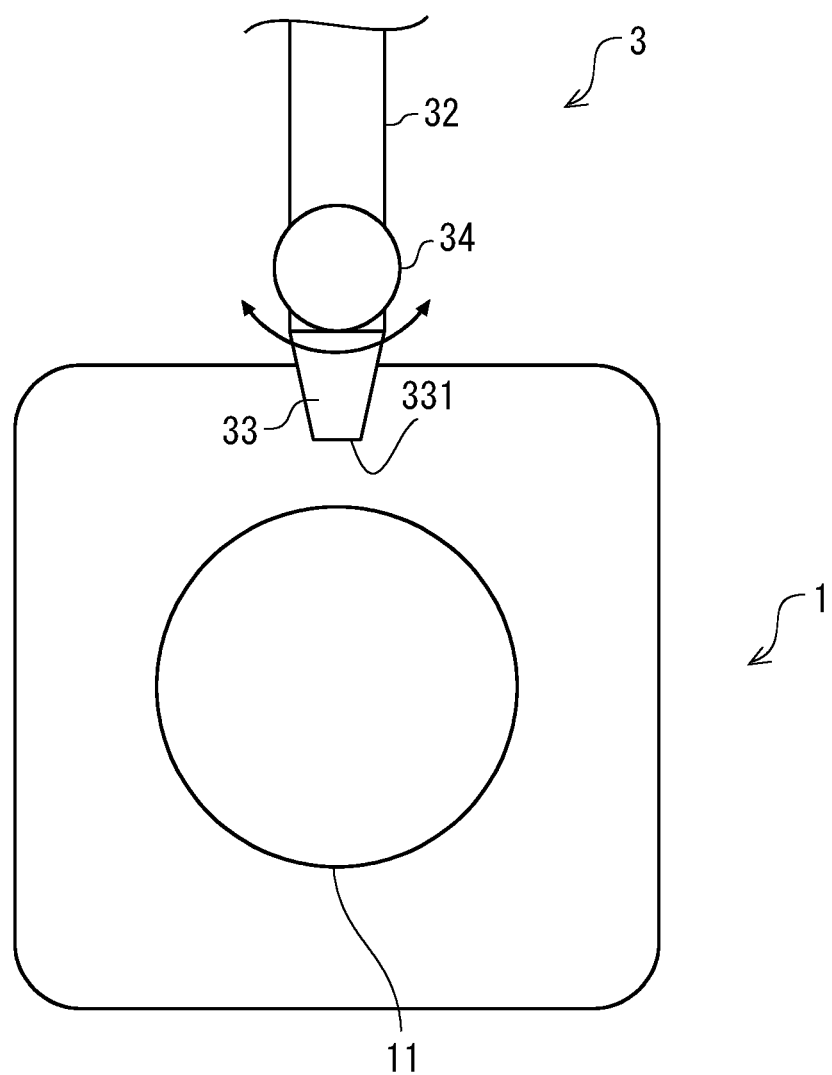
FIG. 2 is a diagram illustrating a deposit removal device according to the embodiment.

The deposit removal device 3 performs a removal action for removing deposits, under control of the control device 4. The deposit removal device 3 according to the embodiment performs the removal action to thereby spray compressed air to the lens 11 of the camera 1 and remove deposits attached to the lens 11. The deposit removal device 3 includes a pump 31, a hose 32, a nozzle 33, and a drive unit 34. The pump 31 is a so-called air pump, and generates compressed air by operating and compressing air under control of the control device 4. The pump 31 is capable of changing an amount of spraying or a pressure of spraying of the compressed air under control of the control device 4. The compressed air generated by the pump 31 is supplied to the nozzle 33. FIG. 2 is a diagram illustrating the deposit removal device 3 according to the embodiment. As illustrated in FIG. 2, the nozzle 33 is provided near the lens 11 of the camera 1, and is installed above the lens 11. The nozzle 33 sprays the compressed air that is supplied from the pump 31 through the hose 32, toward the lens 11 of the camera 1 from a spray port 331 provided at a tip end. The drive unit 34 is capable of changing a direction of the nozzle 33 by driving the nozzle 33 under control of the control device 4. For example, the drive unit 34 consists of a stepper motor. With such a deposit removal device 3, the pump 31 is capable of changing the amount of spraying or the pressure of spraying of the compressed air to deposits under control of the control device 4, and a direction of spraying of the compressed air to deposits may be changed by the drive unit 34 changing the direction of the nozzle 33 under control of the control device 4. The deposit removal device 3 is an example of "deposit removal means" of the present invention.

The control device 4 controls the display/operation device 2 and the deposit removal device 3 by executing programs, and causes the deposit removal device 3 to remove deposits according to an operation on the display/operation device 2 by a user. The control device 4 includes a display control unit 41, a deposit detection unit 42, a operation attribute determination unit 43, a removal action control unit 44, and a storage unit 45. For example, the control device 4 is a car navigation device including such components. The control device 4 is an example of "control means" of the present invention.

The display control unit 41 controls the display unit 21 described above. The display control unit 41 according to the embodiment causes the control device 4 to function as a back monitor device, by causing the display unit 21 to display an image that is acquired by the camera 1 at the time of the vehicle moving backward. Furthermore, although details will be given later, the display control unit 41 enlarges and displays a region where a pinch-out operation is performed, when a pinch-out operation is performed on an image that is displayed on the display unit 21.

The deposit detection unit 42 detects a deposit included in an image that is acquired by the camera 1. The deposit detection unit 42 detects a deposit included in an image, by performing an edge detection process. A deposit is shown blurred in an image, and thus, the deposit detection unit 42 derives an intensity of an edge in each pixel in the image, and detects, as one deposit, a collection of pixels (region) where the derived intensities of edges are within a specific range. The deposit detection unit 42 outputs, as deposit information, information including a position and a size (range) of a deposit and the number of deposits in the image. Note that the method used by the deposit detection unit 42 to detect a deposit is not limited to the method described above, and an arbitrary method may be selected.

When the operation detection unit 22 detects a contact operation, the operation attribute determination unit 43 acquires operation information that is output from the operation detection unit 22, and determines an attribute of the contact operation detected by the operation detection unit 22, based on the operation information. As the attribute of the contact operation, the operation attribute determination unit 43 determines a type of the contact operation, a position or a range on the display unit 21 where the contact operation is performed, a direction of the contact operation (operation direction), a distance of the contact operation (operation distance), a speed of the contact operation (operation speed), and the like.

Here, types of contact operation to be determined by the operation attribute determination unit 43 include a slide operation, a flick operation, a tap operation, a pinch-in operation, a pinch-out operation, and the like. In the present specification, a "slide operation" refers to a series of contact operations of a user, from bringing a finger into contact with the display unit 21 (touch-on), to changing a contact position by sliding the finger while maintaining a contact state between the display unit 21 and the finger, and to separating the finger from the display unit 21 at a position away from a touch-on position (touch-off). When there is a touch-off at a position that is separate from the touch-on position by a predetermined distance or more, the operation attribute determination unit 43 determines that there is a slide operation. Furthermore, in the present specification, a "flick operation" refers to a swift slide operation. That is, in the present specification, a flick operation is an aspect of slide operation. When a contact position is changed at a predetermined speed or higher after a touch-on, and then, a touch-off is performed, the operation attribute determination unit 43 determines that there is a flick operation. Furthermore, a "tap operation" refers to a contact operation of swiftly performing a touch-off after a touch-on. When a distance between a touch-on position and a touch-off position is smaller than a predetermined distance, and an action from a touch-on to a touch-off is completed within a predetermined period of time, the operation attribute determination unit 43 determines that there is a tap operation. Furthermore, if a tap is detected again within a predetermined period of time after a tap, the operation attribute determination unit 43 determines that there is a "double-tap operation". If a tap is further detected again within a predetermined period of time, it is determined that a "triple-tap operation" is performed. A "pinch-in operation" refers to a contact operation of performing a slide operation in a manner of moving two fingers in directions of coming close to each other. A "pinch-out operation" refers to a contact operation of performing a slide operation in a manner of moving two fingers in directions away from each other. In a state where contacts are simultaneously made at two points, if contact position coordinates are changed in directions of reducing a distance between the two points, the operation attribute determination unit 43 determines that a pinch-in operation is performed, and if the contact position coordinates are changed in directions of increasing the distance between the two points, the operation attribute determination unit 43 determines that a pinch-out operation is performed.

The removal action control unit 44 determines, based on a determination result of the operation attribute determination unit 43, whether or not a contact operation is a removal operation, as a specific operation, that is performed on an image, and if the contact operation is the removal operation, the deposit removal device 3 is caused to perform a removal action. The removal action control unit 44 according to the embodiment determines that the removal operation is performed, when a contact operation detected by the display unit 21 is a flick operation on the image.

Furthermore, when a removal operation is performed, the removal action control unit 44 determines a target of the removal operation based on the operation information output from the operation detection unit 22 and the deposit information output from the deposit detection unit 42, and if the target of the removal operation is a specific deposit in the image, the deposit removal device 3 is caused to perform the removal action on the specific deposit. The removal action control unit 44 compares positions, in the image, where the removal operation is performed and where deposits are detected, and determines on which deposit the removal operation is performed.

The removal action control unit 44 causes the pump 31 to operate, by generating a trigger signal and outputting the trigger signal to the pump 31, and causes the deposit removal device 3 to perform the removal action. Furthermore, the removal action control unit 44 changes the amount of spraying and the pressure of spraying of compressed air that is sprayed from the nozzle 33, by outputting a control signal to the pump 31 by serial communication. Furthermore, the removal action control unit 44 changes the direction of the nozzle 33 by outputting a control signal to the drive unit 34.

The storage unit 45 stores in advance various processing conditions and various parameters to be used in a detection process by the deposit detection unit 42, a determination process by the operation attribute determination unit 43, and a determination process by the removal action control unit 44, and outputs the various processing conditions and the various parameters that are stored to the deposit detection unit 42, the operation attribute determination unit 43, and the removal action control unit 44 as appropriate. A detection result, a determination result, and the like obtained in the control device 4 are also stored in the storage unit 45.

Figure 3:
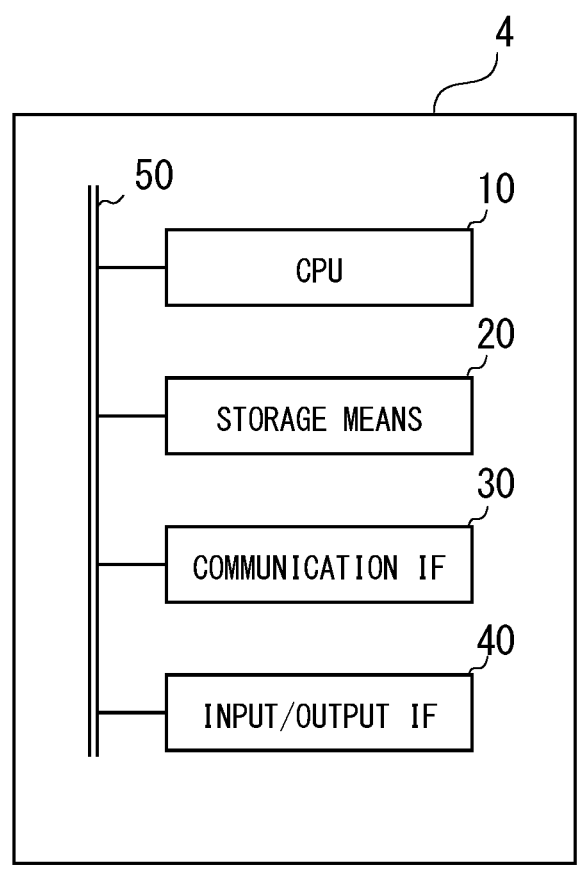
FIG. 3 is a diagram illustrating an example hardware configuration of a control device according to the embodiment.

FIG. 3 is a diagram illustrating an example hardware configuration of the control device 4 according to the embodiment. As illustrated in FIG. 3, the control device 4 includes a central processing unit (CPU) 10, storage means 20, a communication IF 30, and an input/output IF 40 that are interconnected by a connection bus 50. The CPU 10 is a central processing unit that controls the entire control device 4. The CPU 10 is also referred to as a processor. However, the CPU 10 is not limited to a single processor, and may adopt a multi-processor configuration. Alternatively, a single CPU 10 connected by a single socket may have a multi-core configuration. The control device 4 functions as each processing unit of the display control unit 41, the deposit detection unit 42, the operation attribute determination unit 43, and the removal action control unit 44 illustrated in FIG. 1, by the CPU 10 executing a navigation program. However, at least a part of processing of each of the processing units described above may be provided by a digital signal processor (DSP), an application specific integrated circuit (ASIC), or the like. At least a part of each of the processing units described above may be a dedicated large scale integration (LSI) such as a field-programmable gate array (FPGA), or another digital circuit. Furthermore, an analog circuit may be included as at least a part of each of the processing units described above.

The storage means 20 is a storage medium that functions as the storage unit 45 illustrated in FIG. 1, and is a storage medium where the CPU 10 caches programs and data, and develops a work area. For example, the storage means 20 includes a flash memory, a random access memory (RAM), a read only memory (ROM), a hard-disk drive (HDD), a solid state drive (SSD), an erasable programmable ROM (EPROM), a USB memory, a memory card, and the like.

The communication IF 30 is an interface that is connectable to a general-purpose network through a wireless telephone line and via a base station. The communication IF 30 is also connectable to an access point (AP) of a wireless LAN, and may connect to a network via arbitrary communication means.

The input/output IF 40 is an interface for input/output of data between the display/operation device 2 and the control device 4. A contact operation performed by a user on the operation detection unit 22 via the display unit 21 is output to the control device 4 via the input/output IF 40.

(Removal Process for Deposits)

Figure 4:
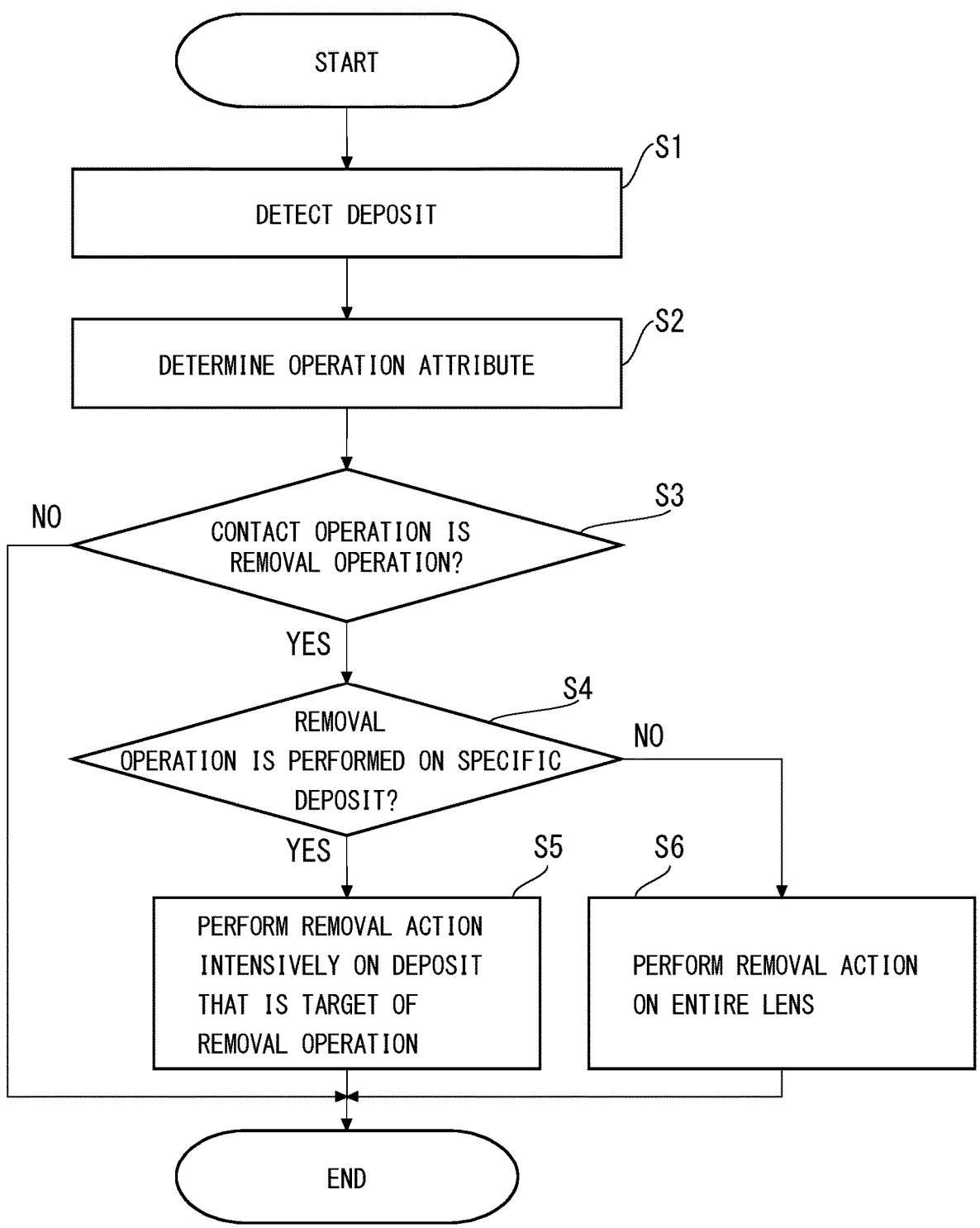
FIG. 4 is a diagram illustrating a flow of a removal process for deposits that is performed by the control device according to the embodiment.
Figure 6:
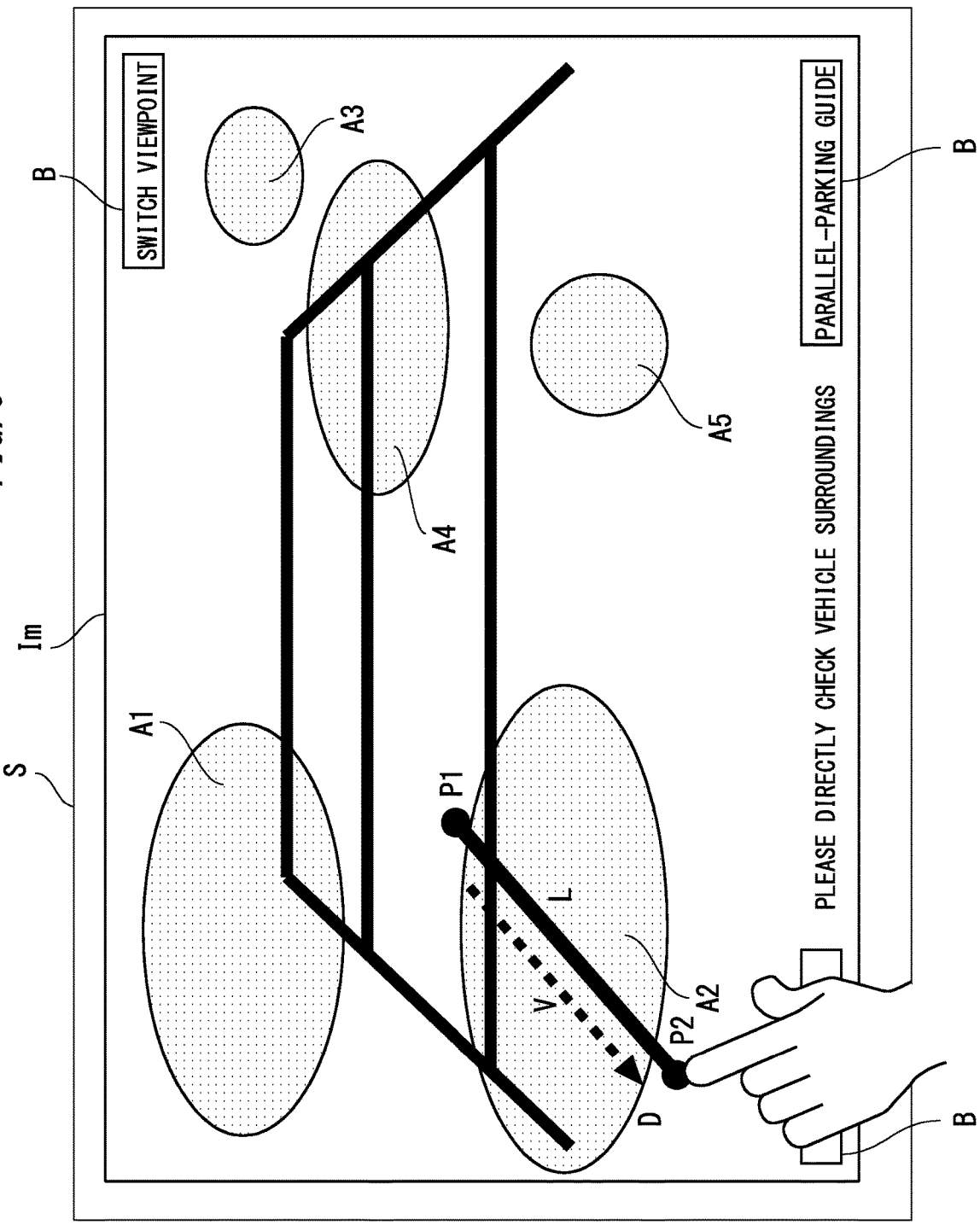
FIG. 6 is a diagram illustrating a screen that is displayed on the display unit, and is a diagram illustrating a state where a flick operation is performed on a specific deposit.
Figure 7:
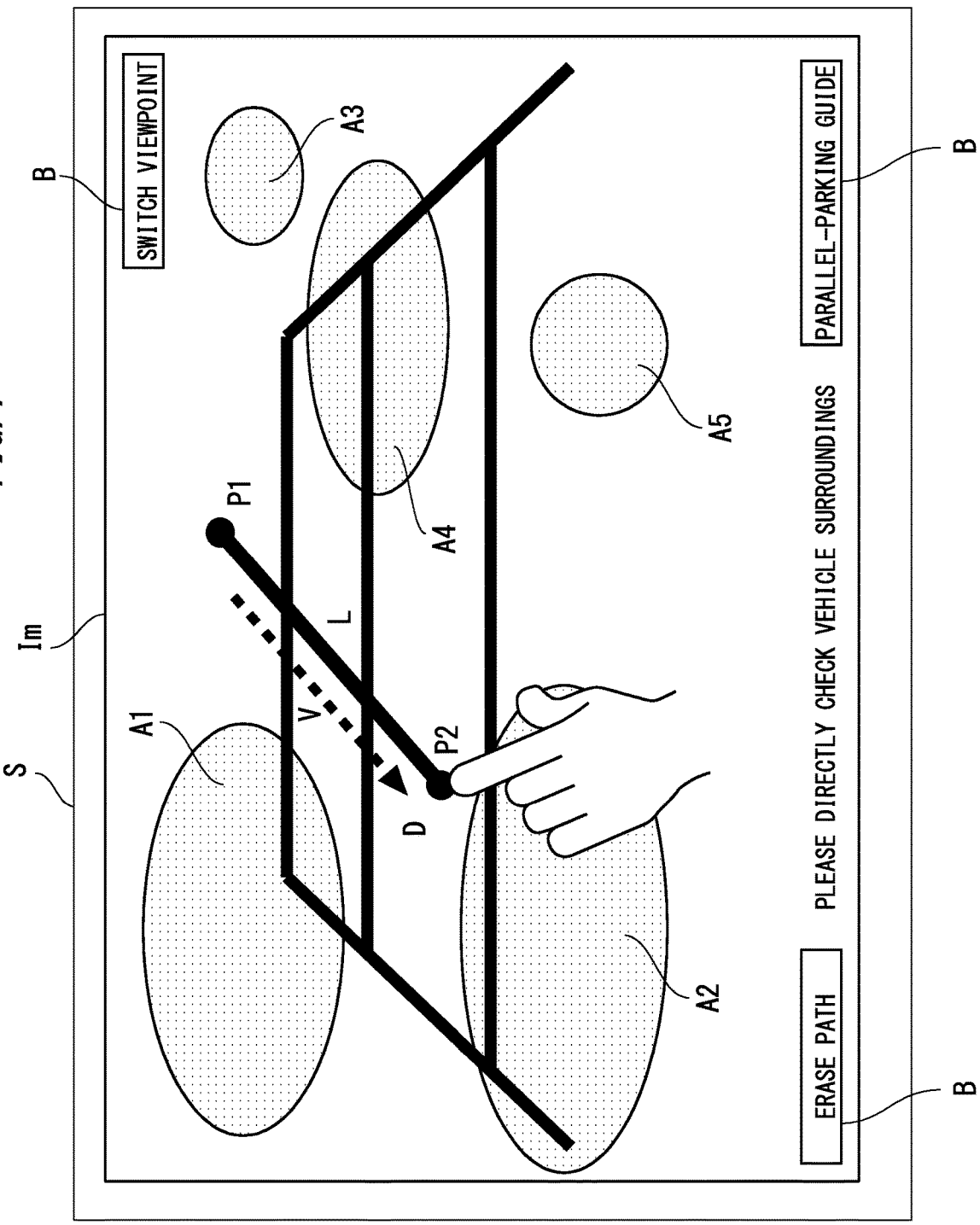
FIG. 7 is a diagram illustrating a screen that is displayed on the display unit, and is a diagram illustrating a state where a flick operation is performed on a region other than deposits.
Figure 8:
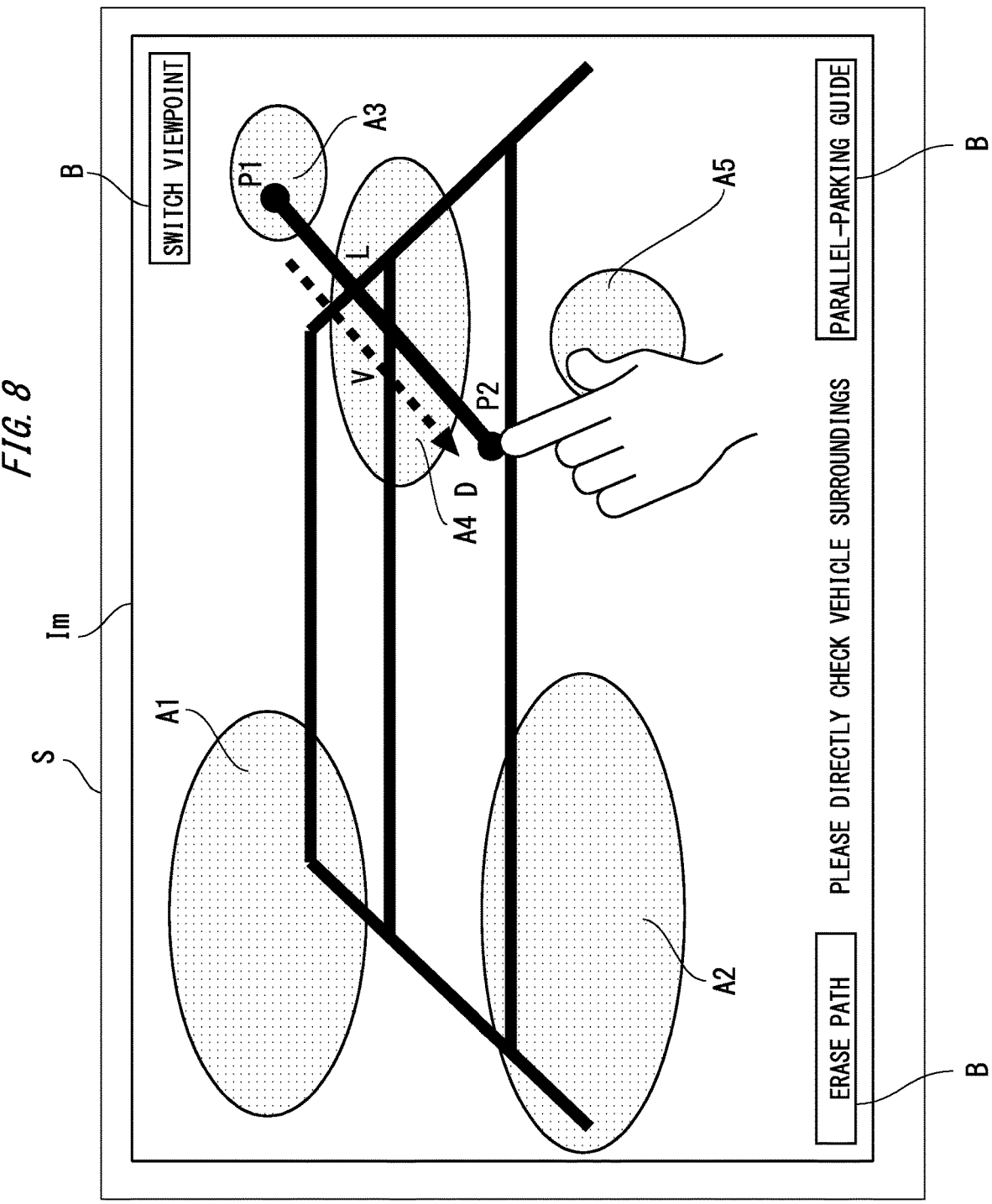
FIG. 8 is a diagram illustrating a screen that is displayed on the display unit, and is a diagram illustrating a state where a removal operation is performed on a plurality of deposits.

Next, a removal process for deposits by the removal system according to the embodiment will be described. FIG. 4 is a diagram illustrating a flow of a removal process for deposits that is performed by the control device 4 according to the embodiment. FIGS. 5 to 8 are diagrams for describing the removal process for deposits, and are diagrams illustrating a screen that is displayed on the display unit 21. FIG. 5 is a diagram illustrating the screen when an image including deposits is displayed, FIG. 6 is a diagram illustrating a state where a flick operation is performed on a specific deposit, FIG. 7 is a diagram illustrating a state where a flick operation is performed on a region other than deposits, and FIG. 8 is a diagram illustrating a state where a removal operation is performed on a plurality of deposits. In the present example, a case is described where the control device 4 is functioning as a back monitor device due to an image of surroundings on the rear side of the vehicle acquired by the camera 1 being displayed on the display unit 21. The present process is repeatedly performed while the display unit 21 is displaying the image.

When a vehicle starts to move backward to enter a parking space, the camera 1 acquires an image of surroundings on the rear side of the vehicle as illustrated in FIG. 5, and the display control unit 41 displays the image on the display unit 21. Here, a region indicated by a symbol S in FIG. 5 indicates the screen on the display unit 21. That is, the screen S is a display region of the display unit 21. A region indicated by a symbol Im in FIG. 5 is the image of the surroundings on the rear side of the vehicle acquired by the camera 1. As illustrated in FIG. 5, a plurality of buttons B for performing various processes of a back monitor device, which are to be selected and operated by a user, are provided superimposed on the image Im. Furthermore, deposits are attached to the lens 11 of the camera 1, and the deposits are displayed in the image Im as illustrated in FIG. 5.

First, in step S1, the deposit detection unit 42 detects a deposit included in the image Im by performing image processing. At this time, the deposit detection unit 42 outputs, to the storage unit 45, deposit information including position coordinates and a size (range) of a deposit and the number of deposits in the image Im.

When a user performs a contact operation on the display unit 21 in this state, as illustrated in FIGS. 6 to 8, the operation detection unit 22 detects the contact operation, and outputs the operation information to the control device 4.

When the operation detection unit 22 outputs the operation information, the operation attribute determination unit 43 determines, in step S2, based on the operation information, attributes of the contact operation including a type of contact operation, a position on the display unit 21 where the contact operation is performed, an operation direction D, an operation distance L, an operation speed V, and the like. Here, a symbol P1 in FIGS. 6 to 8 indicates the touch-on position in the contact operation performed on the display unit 21, and a symbol P2 indicates the touch-off position. The operation attribute determination unit 43 determines the attributes of the contact operation based on the position coordinates of P1 and P2, a period of time when the contact operation is performed, and the like.

Next, in step S3, the removal action control unit 44 determines, based on the determination result in step S2, whether or not the contact operation detected by the operation detection unit 22 is a removal operation, as a specific operation, that is performed on the image Im. For example, the removal action control unit 44 determines that the contact operation is the removal operation, when the contact operation is a flick operation on the image Im. On the other hand, when the contact operation is a contact operation on a region, on the screen S, other than the image Im, or when the contact operation is a contact operation on the image but is not a flick operation, the removal action control unit 44 determines that the contact operation is not the removal operation. When the contact operation is the removal operation (step S3: YES), step S4 is performed next. When the contact operation is not the removal operation (step S3: NO), the present process is ended.

Next, in step S4, the removal action control unit 44 determines, based on the processing result in step S1 and the determination result in step S2, whether or not the removal operation is performed on a specific deposit. Specifically, the removal action control unit 44 compares the positions of deposits output from the deposit detection unit 42 against the position and range of the removal operation output from the operation attribute determination unit 43, and determines on which deposit the removal operation is performed. When the number of deposits, among the deposits detected by the deposit detection unit 42, on which the removal operation is performed is one or more and equal to or smaller than a predetermined number, the removal action control unit 44 determines that the removal operation is performed on specific deposit(s). On the other hand, if the number of deposits on which the removal operation is performed is zero, or if the number exceeds the predetermined number, it is determined that the removal operation is not performed on specific deposit(s). The number of deposits on which the removal operation is performed is zero, when the target on which the removal operation is performed is in a region, in the image Im, other than the deposits.

Here, in the example illustrated in FIG. 6, the removal operation is performed only on a deposit A2, among deposits A1 to A5 included in the image Im. In the example illustrated in FIG. 7, the removal operation is performed on a region, in the image Im, other than the deposits A1 to A5. In the example illustrated in FIG. 8, the removal operation is performed on the deposit A3 and the deposit A4, among the deposits A1 to A5 included in the image Im. In the embodiment, the removal action control unit 44 determines that the removal operation is performed on a specific deposit, when the number of deposits, among the deposits detected by the deposit detection unit 42, on which the removal operation is performed is one, as illustrated in FIG. 6, and, on the other hand, determines that the removal operation is not performed on a specific deposit, when the number of deposits on which the removal operation is performed is zero or two or more, as illustrated in FIGS. 7 and 8. Note that the predetermined number of deposits by which the removal action control unit 44 determines that the removal operation is performed on a specific deposit is not limited to one. The removal action control unit 44 may determine that the removal operation is performed on a specific deposit, when the removal operation is performed on deposit(s), the number of which is one or more and a predetermined number or smaller. When the removal operation is performed with a specific deposit as a target, step S5 is performed next. When the removal operation is not performed with a specific deposit as a target, step S6 is performed next.

In step S5, the removal action control unit 44 causes the removal action to be performed intensively on the specific deposit which is determined in step S4 to be the target of the removal operation (i.e., the deposit A2 in FIG. 6), by controlling the deposit removal device 3. The deposit removal device 3 operates the pump 31, and sprays compressed air from the nozzle 33, according to control of the removal action control unit 44. At this time, the removal action control unit 44 drives the nozzle 33 by the drive unit 34, and directs the spray port 331 of the nozzle 33 toward the deposit which is taken as the target of the removal operation, and thereby intensively sprays the compressed air toward the deposit which is taken as a removal target. The deposit which is determined to be the target of the removal operation may thereby be reliably blown off (scattered) and removed. When step S5 is completed, the present process is ended.

In step S6, the removal action control unit 44 causes the removal action to be performed intensively on the entire lens 11, by controlling the deposit removal device 3. At this time, the removal action control unit 44 causes the compressed air to be sprayed evenly onto the entire lens 11 while changing the direction of the spray port 331 of the nozzle 33, by driving the nozzle 33 by the drive unit 34. All the deposits detected in the image Im may thus be evenly blown off and removed. When step S6 is completed, the present process is ended.

In the case where a deposit is desired to be removed by such a removal process for deposits, a user may perform the removal action on the entire lens 11 by first performing a flick operation on a plurality of deposits in the image Im or on a region, in the image Im, other than the deposits. Then, if not all the deposits are removed, and a deposit is still present in the image Im, a flick operation may be performed on a specific deposit which has been not successfully removed. Then, the removal action is performed intensively on the specific deposit on which the flick operation is performed. By performing the removal actions in such an order, all the deposits may be reliably removed by a small number of removal operations.

Here, in steps S5 and S6, the removal action control unit 44 changes, with respect to the compressed air, the direction of spraying, the amount of spraying, and the pressure of spraying, by controlling the deposit removal device 3 based on the operation direction D, the operation distance L, the operation speed V, and the like of the removal operation determined by the operation attribute determination unit 43 in step S2. The removal action control unit 44 changes the direction of the spray port 331 of the nozzle 33 by controlling the drive unit 34, such that the spraying direction of the compressed air becomes the same as the operation direction on the screen S. The direction of removal of deposits (i.e., a direction of blowing off; hereinafter a "removal direction") thereby becomes the same as the operation direction. For example, in the case where a user performs a flick operation in the operation direction as illustrated in FIGS. 6 to 8 (a direction from upper right toward lower left), the removal action control unit 44 controls the deposit removal device 3 in such a way that the spraying direction of the compressed air becomes the same as the operation direction on the screen S. As a result, a deposit is blown off toward the lower left on the screen S. Furthermore, the removal action control unit 44 changes the amount of spraying and the pressure of spraying of the compressed air by controlling the pump 31 according to the operation speed and the operation distance. The removal action control unit 44 increases the amount of spraying and the pressure of spraying as the operation speed and the operation distance are greater. In the case of the present example, the greater the speed or stroke of the flick operation is, the greater the pressure of spraying is and the greater the force (removal strength) for blowing off the deposit is. For example, with respect to a deposit which has been not successfully removed by a first removal action, if a user performs a flick operation faster or with a longer stroke than the first time, on the deposit, the deposit may be blown off with a greater force than that of the first removal action.

(Operations/Effects)

As described above, the removal system 100 according to the embodiment includes the camera 1, the display unit 21 that displays an image that is acquired by the camera 1, the operation detection unit 22 that detects a contact operation of a user on the display unit 21, the deposit removal device 3 that performs a removal action for removing a deposit that is attached to the lens 11 of the camera 1, and the control device 4 that causes the deposit removal device 3 to perform the removal action, based on the contact operation on an image detected by the operation detection unit 22. That is, the removal system 100 removes a deposit according to an operation that is performed by a user on an image in which the deposit is displayed. Accordingly, the user may be provided with a sensation of actually removing a deposit by an operation of the user. Furthermore, the user may remove a deposit by an intuitive operation based on the image. Therefore, with the removal system 100, fun and excitement may be provided to the user in removal of deposits.

The control device 4 includes the removal action control unit 44 that determines whether or not an operation detected by the operation detection unit 22 is the removal operation, as a specific operation, that is performed on an image, and that causes the deposit removal device 3 to perform the removal action, when the operation is the removal operation. With such a removal system 100, a user has to perform a specific operation on an image to remove a deposit. Accordingly, a game property may be added to removal of deposits, and even more fun and excitement may be provided to the user. Furthermore, the removal operation is a contact operation, and thus, the user may remove a deposit by a more intuitive operation. However, the present invention does not limit the removal operation to the contact operation, and the removal operation may alternatively be a gesture operation on the image, for example.

The control device 4 further includes the deposit detection unit 42 that detects a deposit in an image, and when a target of the removal operation is a specific deposit in the image, the removal action control unit 44 causes the deposit removal device 3 to perform a removal action on the specific deposit. A user may thereby reliably remove a deposit that the user wants to remove. Furthermore, by allowing the user to select a deposit which is to be taken as a removal target, a game property may be added to removal of deposits. As a result, with the removal system 100, even more fun and excitement may be provided to the user in removal of deposits.

Furthermore, the removal action control unit 44 changes the direction of removing a deposit, according to the operation direction of the removal operation. Moreover, the removal action control unit 44 changes strength for removing a deposit, according to the operation speed and the operation distance of the removal operation. Accordingly, a behavior of a deposit to be removed may better reflect the removal operation of the user. As a result, even more fun and excitement may be provided to the user in removal of deposits.

Note that the removal operation is not limited to a flick operation on an image, and may alternatively be a slide operation, a tap operation, a double-tap operation, or a triple-tap operation on an image.

Note that the camera 1 may be a front camera that is provided outside and at a front of a vehicle, and that acquires an image of surroundings on a front side of the vehicle, or may be a side camera (or a corner camera) that is provided outside and on a side of a vehicle and that acquires an image of surroundings on the side of the vehicle. Moreover, the camera 1 may be a combination of a plurality of cameras described above. The deposit detection unit 42 may combine images acquired by a plurality of cameras 1, and may generate, and display on the display unit 21, a bird's-eye image having a viewpoint above the vehicle.

The deposit removal device 3 may also remove deposits by spraying a washer liquid (cleaning liquid), as a spraying object, toward the lens 11 of the camera 1, instead of the compressed air. Furthermore, the deposit removal device 3 according to the present invention may remove deposits by a wiper sweeping away the deposits.

First Example Modification

Figure 9:
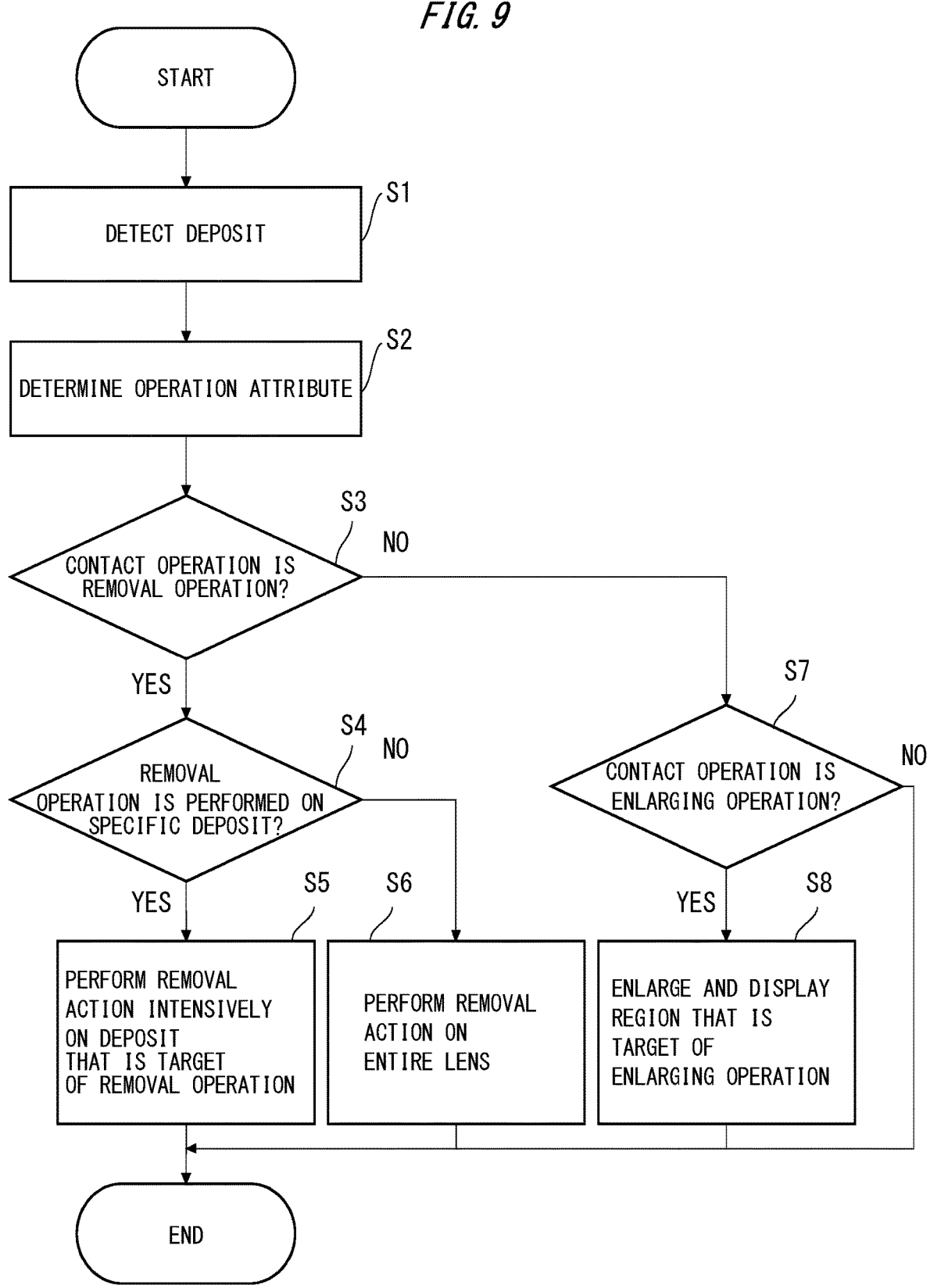
FIG. 9 is a diagram illustrating a flow of a removal process for deposits according to a first example modification.
Figure 10:
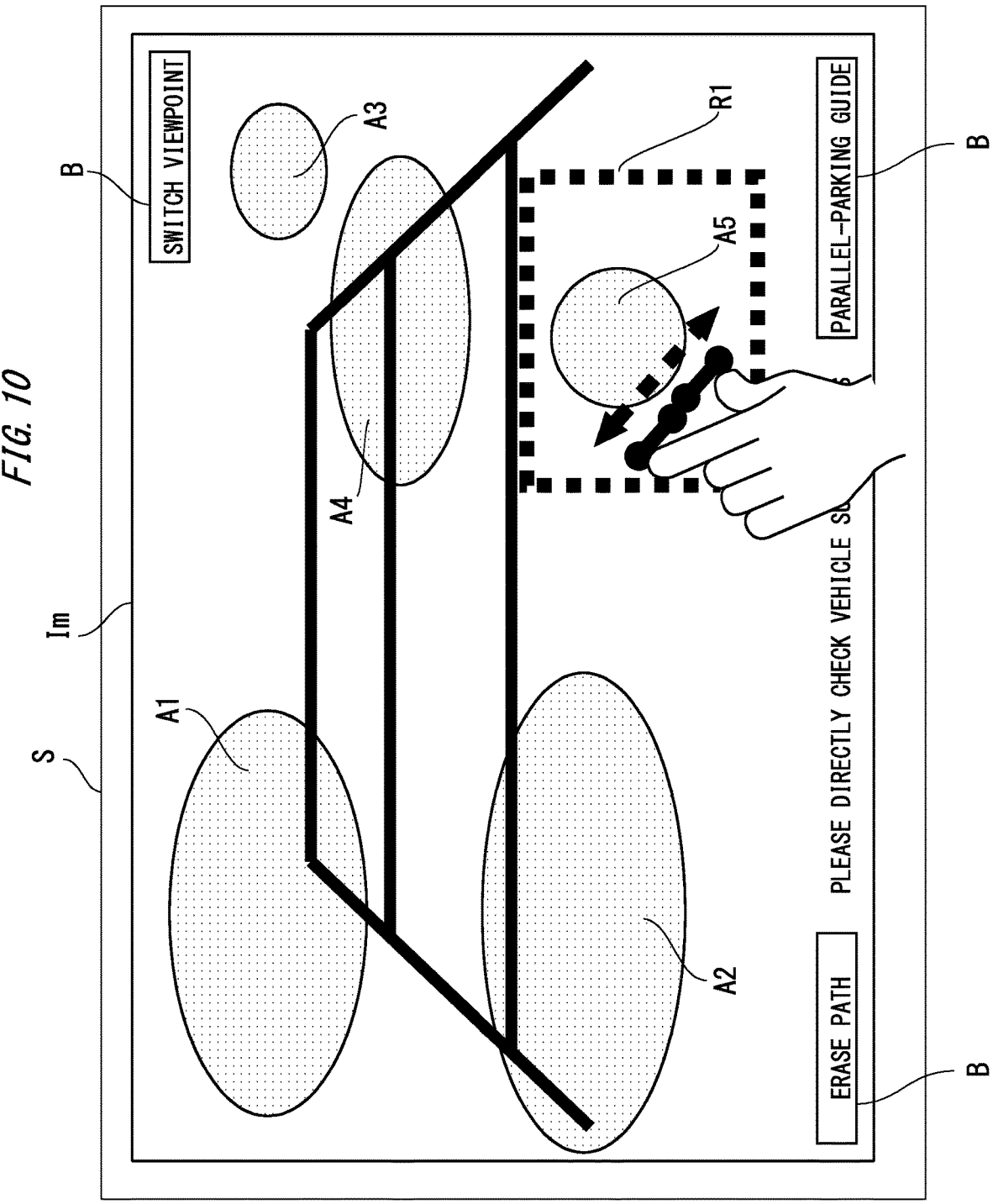
FIG. 10 is a diagram illustrating a screen that is displayed on the display unit in the first example modification, and is a diagram illustrating a state where a pinch-out operation is performed on a specific deposit.
Figure 11:
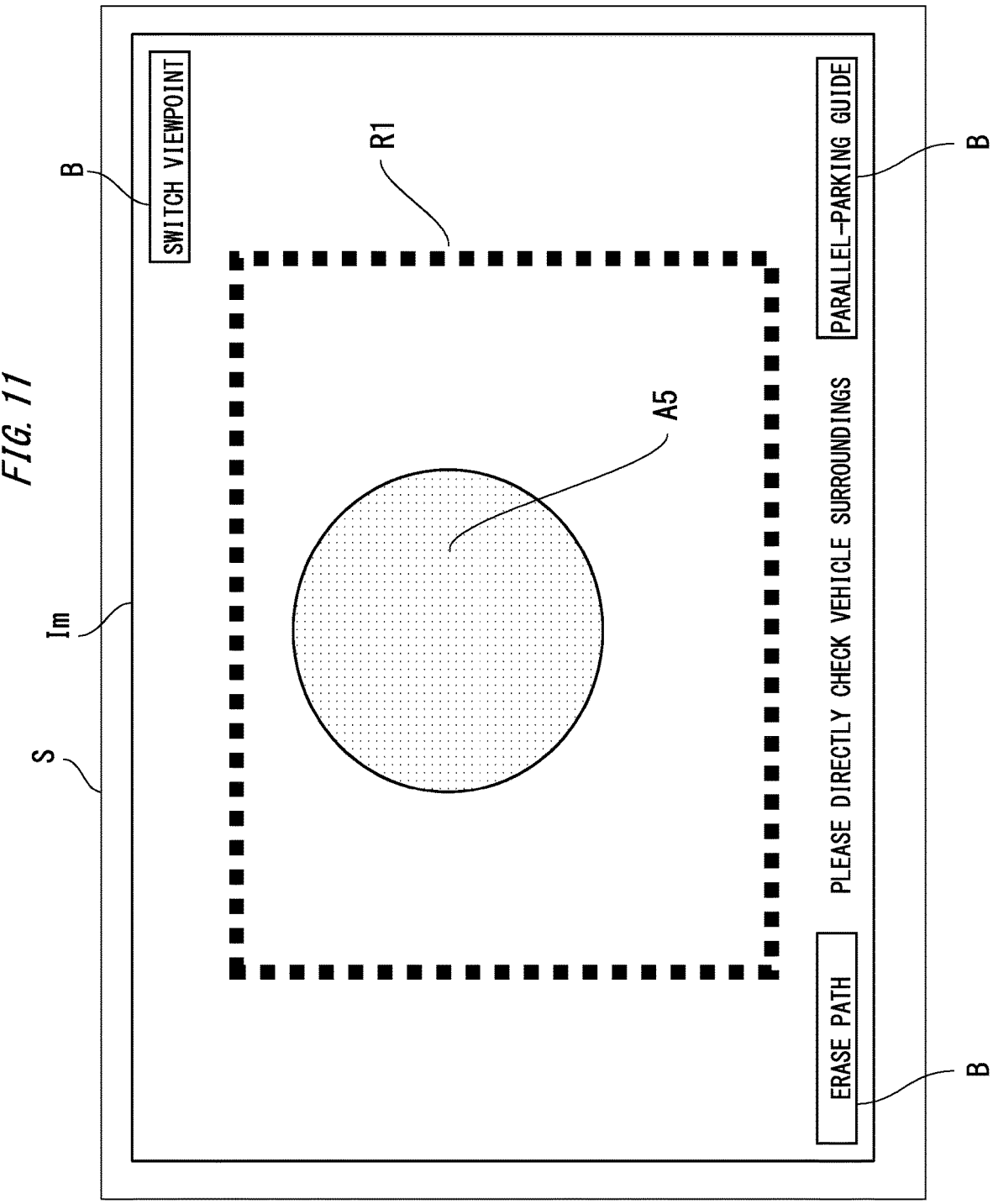
FIG. 11 is a diagram illustrating a screen that is displayed on the display unit, and is a diagram illustrating a state where a region where the pinch-out operation is performed is displayed in an enlarged manner.

FIG. 9 is a diagram illustrating a flow of a removal process for deposits according to a first example modification. FIGS. 10 and 11 are diagrams for describing the removal process for deposits, and are diagrams illustrating a screen that is displayed on the display unit 21. FIG. 10 is a diagram illustrating a state where a pinch-out operation is performed on a specific deposit, and FIG. 11 is a diagram illustrating a state where a region where the pinch-out operation is performed is displayed in an enlarged manner.

In the first example modification, if, as a result of determination performed, based on a determination result in step S2, by the removal action control unit 44 in step S3 regarding whether or not a contact operation is a removal operation, it is indicated that the contact operation is not a removal operation (step S3: NO), step S7 is performed next.

In step S7, the display control unit 41 determines whether or not the contact operation detected by the operation detection unit 22 is an enlarging operation, as a specific operation, that is performed on the image. In the first example modification, the display control unit 41 determines that the contact operation is the enlarging operation, when the contact operation is a pinch-out operation that is performed on the image. When the contact operation is the enlarging operation (step S7: YES), step S8 is performed next. When the contact operation is not the enlarging operation (step S7: NO), the present process is ended.

In step S8, the display control unit 41 enlarges and displays a region on which the enlarging operation is performed, based on the processing result in step S1 and the determination result in step S2.

When a pinch-out operation is performed on the image Im, as illustrated in FIG. 10, a region where the pinch-out operation is performed becomes displayed in an enlarged manner, as illustrated in FIG. 11. For example, in the case where a deposit is displayed small in the image Im, as in the case of the deposit A5 in FIG. 10, and a user cannot perform a removal operation on the deposit A5, a region R1 including the deposit A5 may be displayed in an enlarged manner by the pinch-out operation (enlarging operation) on the deposit A5. The removal operation may be performed in this state on the deposit A5 in the region R1, which is displayed in an enlarged manner. According to the first example modification as described above, a user may easily perform the removal operation by performing the enlarging operation on a deposit which is desired to be removed, and by causing the deposit to be displayed in an enlarged manner. As a result, removal of deposits may be more reliably performed.

Second Example Modification

Figure 12:
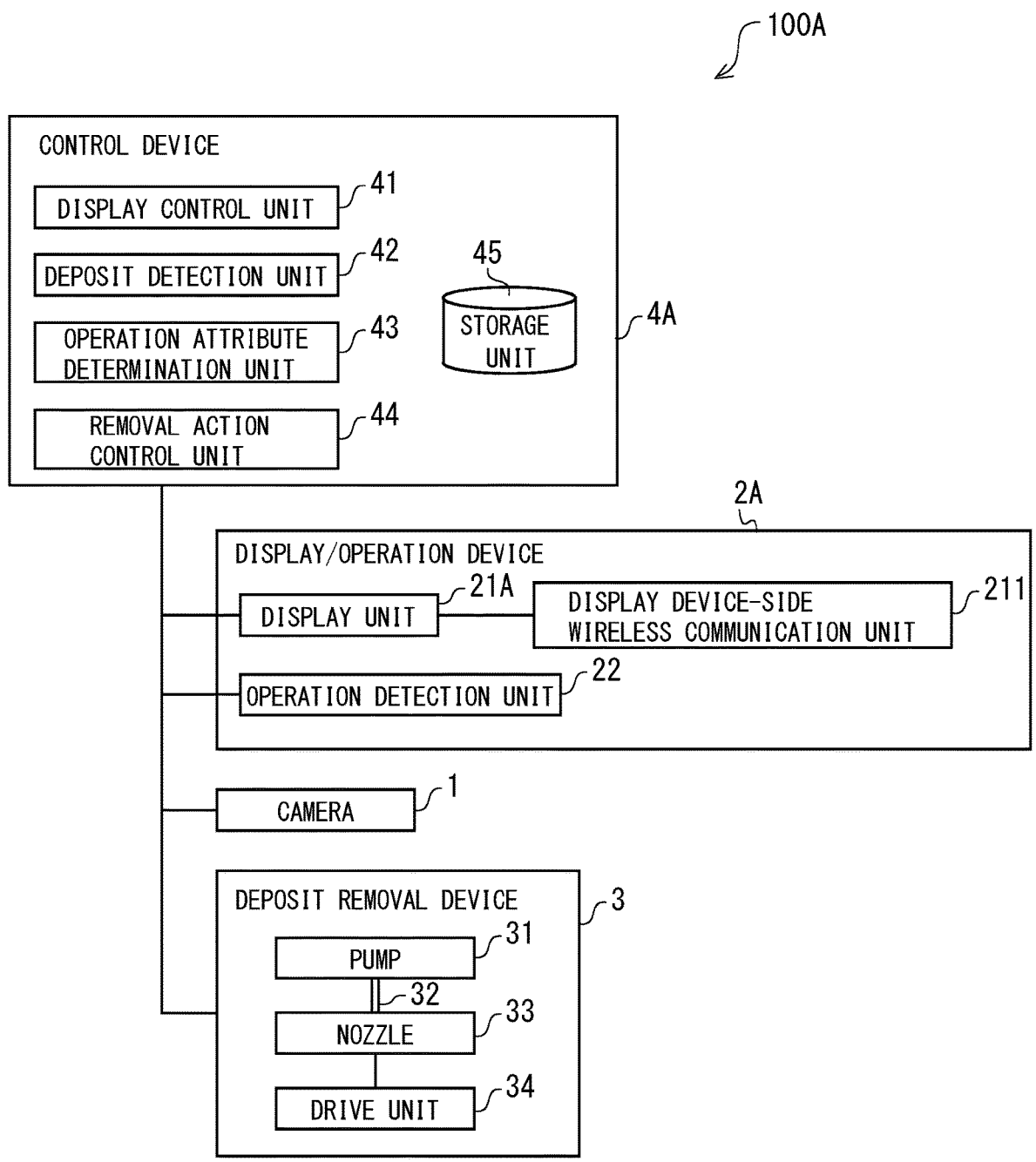
FIG. 12 is a block diagram illustrating a deposit removal system according to a second example modification.

FIG. 12 is a block diagram illustrating a removal system 100A according to a second example modification. A display unit 21A of a display/operation device 2A according to the second example modification includes a display device-side wireless communication unit 211 that performs wireless communication between the display unit 21A and the camera 1. Furthermore, a control device 4A according to the second example modification includes a control device-side wireless communication unit 46 that performs wireless communication between the control device 4A and the deposit removal device 3. The display unit 21A and the control device 4A establish wireless communication by a wireless network architecture conforming to IEEE 802.11 standard, for example. However, the standard for wireless communication by the display unit 21A and the control device 4A is not limited to IEEE 802.11, and other standards may also be used. Moreover, wireless communication by the display unit 21A and the control device 4A may be performed by Bluetooth (registered trademark), for example.

The display unit 21A according to the second example modification acquires an image from the camera 1 by performing wireless communication with the camera 1 through the display device-side wireless communication unit 211, and the control device 4A causes the deposit removal device 3 to perform a removal action, by performing wireless communication with the deposit removal device 3 through the control device-side wireless communication unit 46. With the removal system 100A according to the second example modification as described above, the camera 1 and the deposit removal device 3 may be installed at a remote location of other components. That is, a remote camera may be used as the camera 1. Accordingly, the removal process for deposits described above may be performed at cameras other than vehicle-mounted cameras, such as surveillance cameras, for example.

Third Example Modification

Figure 13:
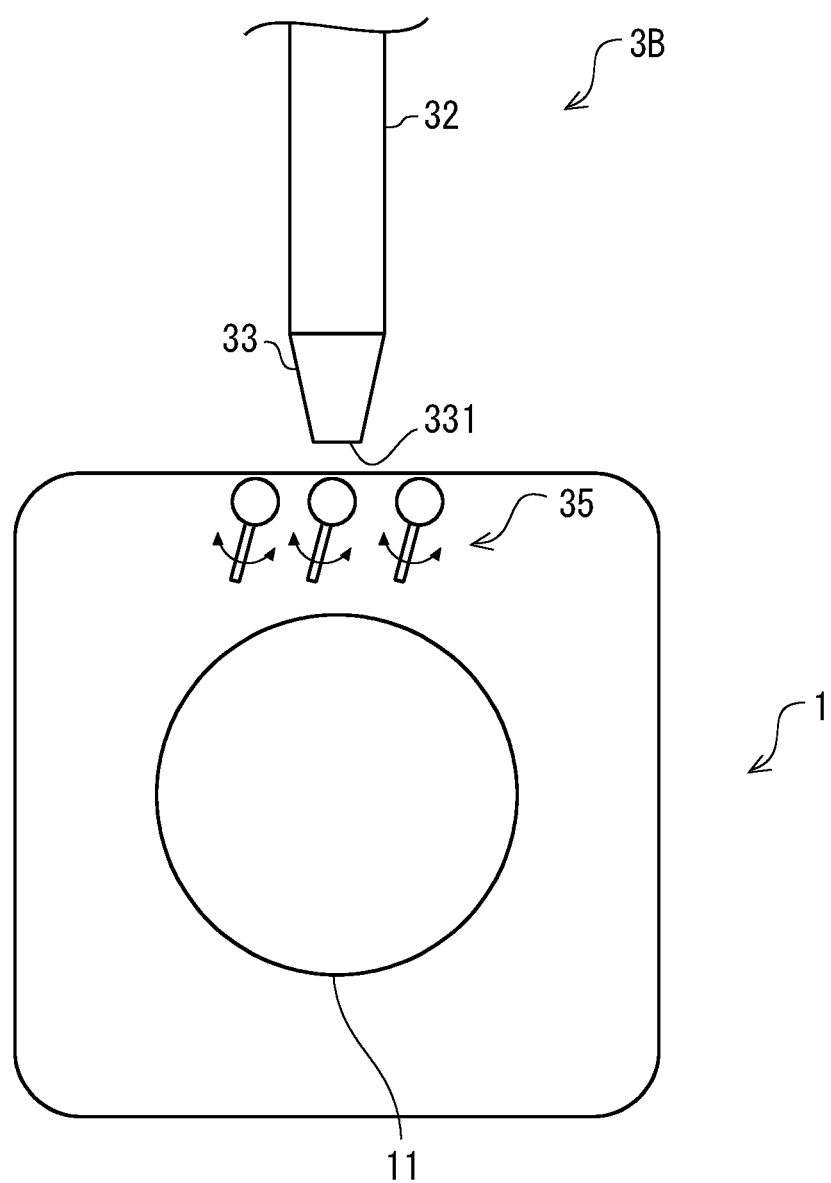
FIG. 13 is a diagram illustrating a deposit removal device according to a third example modification.

FIG. 13 is a diagram illustrating a deposit removal device 3B according to a third example modification. As illustrated in FIG. 13, the deposit removal device 3B includes, instead of the drive unit 34 of the deposit removal device 3, a guide plate 35, an angle of which is changeable under control of the control device 4. The guide plate 35 is a plate member that is installed at the spray port 331 of the nozzle 33, and a traveling direction of compressed air that is sprayed from the nozzle 33 may be changed by changing the angle of the guide plate 35. As a result, a removal operation may be performed intensively on a deposit on which the removal operation is performed by a user, or a removal direction may be changed.

Fourth Example Modification

Figure 14:
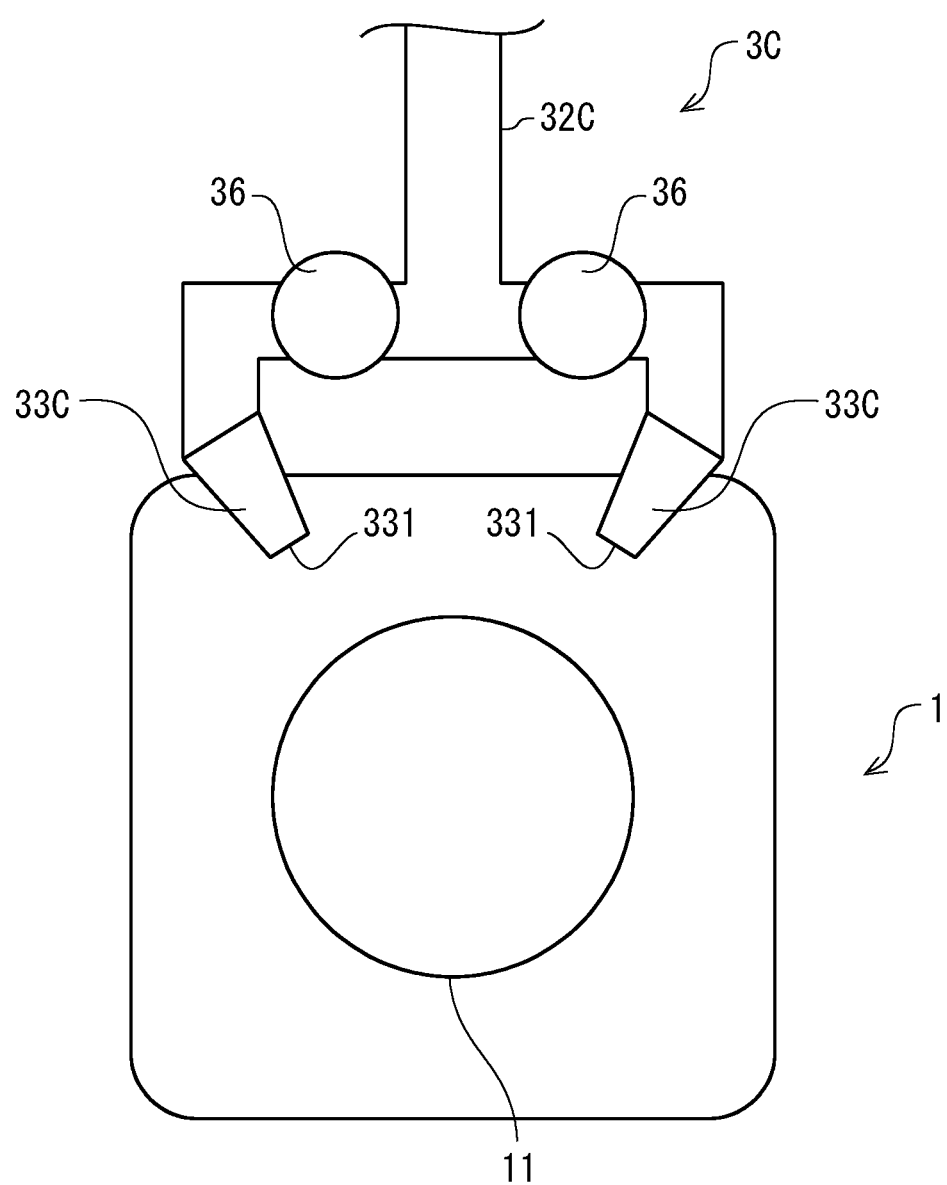
FIG. 14 is a diagram illustrating a deposit removal device according to a fourth example modification.

FIG. 14 is a diagram illustrating a deposit removal device 3C according to a fourth example modification. As illustrated in FIG. 14, the deposit removal device 3C includes a hose 32C that is branched, a plurality of nozzles 33C each provided at a branched tip of the hose 32C, and a solenoid valve 36 that is provided for each nozzle 33. The solenoid valve 36 is capable of switching between supply/non-supply of compressed air to the respective nozzles 33C by opening/closing the hose 32C under control of the control device 4. By selecting the nozzle 33C from which compressed air is to be sprayed, the deposit removal device 3C may selectively perform a removal operation on a deposit on which the removal operation is performed by a user, or may change a removal direction. Furthermore, by changing the number of nozzles 33C from which compressed air is to be sprayed, the pressure of spraying of compressed air may be changed, and therefore, removal strength may be changed.

A preferred embodiment of the present invention has been described above. Various embodiments described above may be combined in any possible way.

The invention claimed is:

1. A deposit removal system comprising:
   a camera;
   a display unit that displays an image that is acquired by the camera;
   a detection unit that detects a removal operation of a user on the display unit;
   a deposit removal device that performs a removal action for removing a deposit that is attached to a lens of the camera; and
   a control device that causes the deposit removal device to perform the removal action, based on the removal operation on the display unit detected by the detection unit,
   wherein the removal operation is an operation of a finger of the user moving on a screen of the display unit, and the removal operation is a slide operation or a flick operation on the image, and
   wherein the control device changes a direction of removing the deposit, according to an operation direction of the removal operation.

2. The deposit removal system according to claim 1, wherein the control device includes a deposit detection unit that detects the deposit in the image, and when a target of the removal operation is a specific deposit in the image, the control device causes the deposit removal device to perform the removal action on the specific deposit.

3. The deposit removal system according to claim 1, wherein
the display unit acquires the image from the camera by performing wireless communication with the camera, and
the control device causes the deposit removal device to perform the removal action, by performing wireless communication with the deposit removal device.

4. A deposit removal method for detecting an operation of a user on a display unit that displays an image that is acquired by a camera, and for removing a deposit that is attached to a lens of the camera, based on the operation, the method comprising:
determining whether or not the operation is a removal operation, as a specific operation, that is performed on the display unit; and
performing a removal action for removing the deposit, when the operation is the removal operation,
wherein the removal operation is an operation of a finger of the user moving on a screen of the display unit, and the removal operation is a slide operation or a flick operation on the image, and
wherein during the performing of the removal action for removing the deposit, a direction of removing the deposit is changed according to an operation direction of the removal operation.

5. A deposit removal system comprising:
a camera;
a display unit that displays an image that is acquired by the camera;
a detection unit that detects a removal operation of a user on the display unit;
a deposit removal device that performs a removal action for removing a deposit that is attached to a lens of the camera; and
a control device that causes the deposit removal device to perform the removal action, based on the removal operation on the display unit detected by the detection unit,
wherein the removal operation is an operation of a finger of the user moving on a screen of the display unit, and the removal operation is a slide operation or a flick operation on the image, and
wherein the control device changes strength for removing the deposit, according to an operation speed of the removal operation.

6. The deposit removal system according to claim 5, wherein the control device includes a deposit detection unit that detects the deposit in the image, and when a target of the removal operation is a specific deposit in the image, the control device causes the deposit removal device to perform the removal action on the specific deposit.

7. The deposit removal system according to claim 5, wherein
the display unit acquires the image from the camera by performing wireless communication with the camera, and
the control device causes the deposit removal device to perform the removal action, by performing wireless communication with the deposit removal device.

8. A deposit removal system comprising:
a camera;
a display unit that displays an image that is acquired by the camera;
a detection unit that detects a removal operation of a user on the display unit;
a deposit removal device that performs a removal action for removing a deposit that is attached to a lens of the camera; and
a control device that causes the deposit removal device to perform the removal action, based on the removal operation on the display unit detected by the detection unit,
wherein the removal operation is an operation of a finger of the user moving on a screen of the display unit, and the removal operation is a slide operation or a flick operation on the image, and
wherein the control device changes strength for removing the deposit, according to an operation distance of the removal operation.

9. The deposit removal system according to claim 8, wherein the control device includes a deposit detection unit that detects the deposit in the image, and when a target of the removal operation is a specific deposit in the image, the control device causes the deposit removal device to perform the removal action on the specific deposit.

10. The deposit removal system according to claim 8, wherein
the display unit acquires the image from the camera by performing wireless communication with the camera, and
the control device causes the deposit removal device to perform the removal action, by performing wireless communication with the deposit removal device.

11. A deposit removal method for detecting an operation of a user on a display unit that displays an image that is acquired by a camera, and for removing a deposit that is attached to a lens of the camera, based on the operation, the method comprising:
determining whether or not the operation is a removal operation, as a specific operation, that is performed on the display unit; and
performing a removal action for removing the deposit, when the operation is the removal operation,
wherein the removal operation is an operation of a finger of the user moving on a screen of the display unit, and the removal operation is a slide operation or a flick operation on the image, and
wherein during the performing of the removal action for removing the deposit, strength for removing the deposit is changed according to an operation speed of the removal operation.

12. A deposit removal method for detecting an operation of a user on a display unit that displays an image that is acquired by a camera, and for removing a deposit that is attached to a lens of the camera, based on the operation, the method comprising:
determining whether or not the operation is a removal operation, as a specific operation, that is performed on the display unit; and
performing a removal action for removing the deposit, when the operation is the removal operation,
wherein the removal operation is an operation of a finger of the user moving on a screen of the display unit, and the removal operation is a slide operation or a flick operation on the image, and wherein during the performing of the removal action for removing the deposit, strength for removing the deposit is changed according to an operation distance of the removal operation.

* * * * *